May 29, 1923.
G. HAZLETT ET AL
LOCKING DEVICE
Filed March 17, 1922
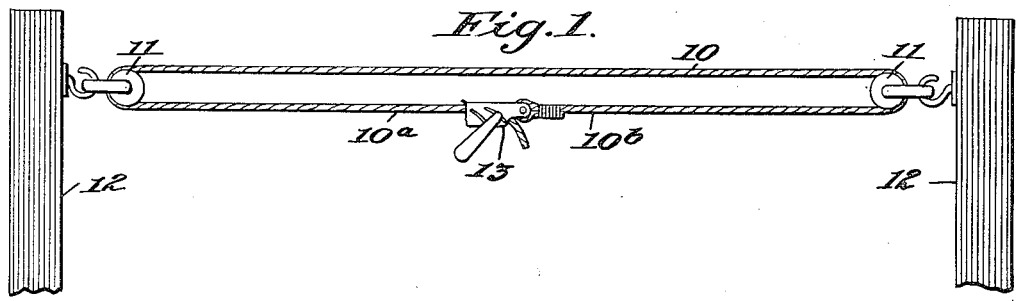
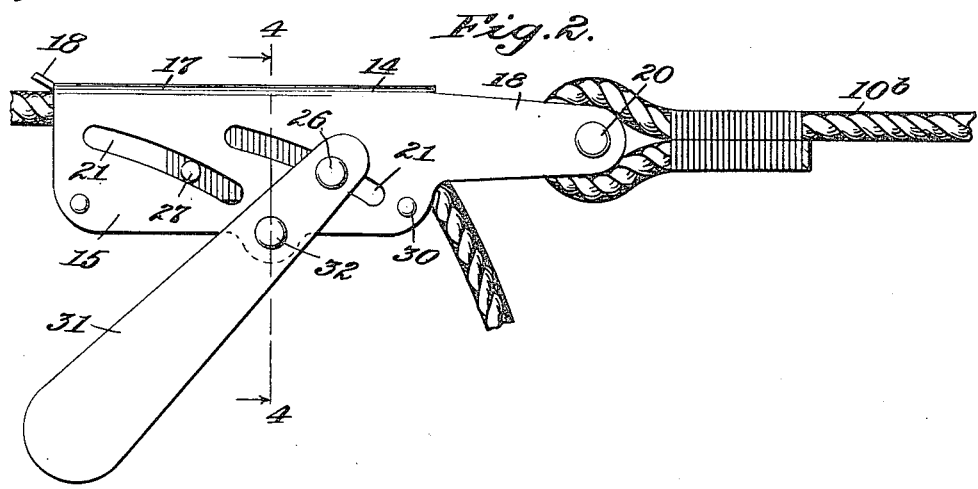
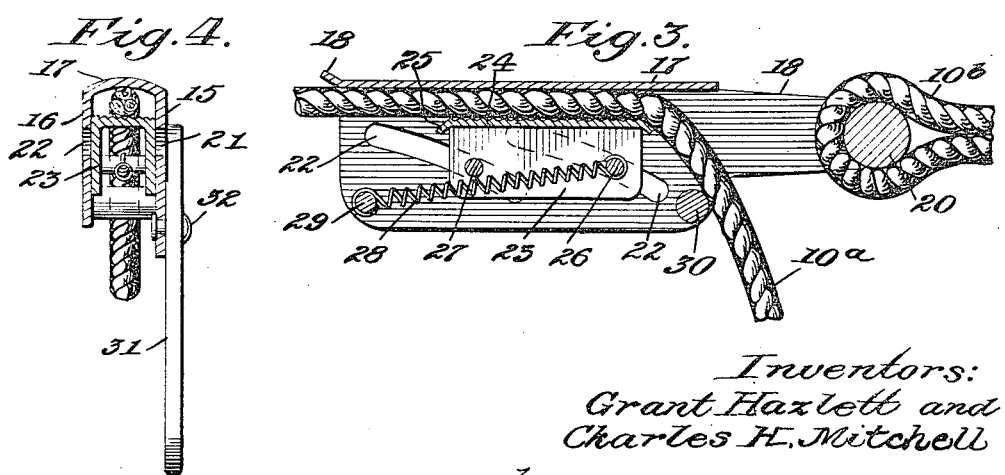
Inventors:
Grant Hazlett and
Charles H. Mitchell
by Wolfe & Moses
Att'ys.

Patented May 29, 1923.

1,457,029

UNITED STATES PATENT OFFICE.

GRANT HAZLETT AND CHARLES H. MITCHELL, OF BINGHAMTON, NEW YORK.

LOCKING DEVICE.

Application filed March 17, 1922. Serial No. 544,676.

*To all whom it may concern:*

Be it known that we, GRANT HAZLETT and CHARLES H. MITCHELL, citizens of the United States, and residents of Binghamton, county of Broome, State of New York, have invented certain new and useful Improvements in Locking Devices, of which the following is a specification.

The invention relates to a device for stretching and retaining cables or the like, for example, those from which electric lamps are suspended, ropes or the like used for tying containers, and chiefly for connecting and holding clothes lines taut, the invention being specifically applied to that class in which a clothes line is passed over pulleys attached to supports and connected at its ends so as to form an endless cable which may be shifted in different directions.

The object of the invention is to provide a simple and efficient means for accomplishing the purpose and consists in the construction and arrangement of parts as explained hereinafter with reference to the accompanying drawing, in which:

Fig. 1 illustrates the device of the invention applied to a clothes line passed over pulleys attached to supports.

Fig. 2 is a lateral elevation of the locking device.

Fig. 3 is a longitudinal section of the device of Fig. 2.

Fig. 4 is a section on 4—4 of Fig. 2.

As shown on Fig. 1, a clothes line 10 extends about the pulleys 11 attached to the supports 12, an end $10^b$ of the line 10 being permanently attached to the locking device 13 forming the subject of the present invention, the other end $10^a$ of the line being releasably attached to said locking device 13.

As shown in elevation on Fig. 2, and in longitudinal and horizontal sections on Figs. 3 and 4 respectively, the locking device 13 comprises a housing 14 consisting of the side portions 15 and 16 and the top portion 17 connecting these latter, and end 18 of the top portion 17 being extended obliquely upwardly therefrom to facilitate the insertion of the end $10^a$ of the line 10. The side portions 15 and 16 likewise comprise extended parts 18 and 19 respectively (the latter not shown) and the free ends of which are connected by means of a transverse bar 20, to which the end $10^b$ of the line 10 is permanently attached.

Each of the two side portions 15 and 16 is provided with two parallel arcuate slots 21—21 and 22—22, the function of which is explained hereinafter.

A locking or pressure element is positioned within the housing 14 and consists of the walls 23—23 and a top portion 24 connecting the said walls 23—23. The part 24 is roughened or corrugated on the surface directed toward the top portion 17 of the housing 14, and the ends thereof extend obliquely downwardly as at 25 so as to facilitate ingress and egress of the end $10^a$ of the line 10. Transverse bars 26 and 27 are rigidly inserted through the member 23 and extend on both sides therefrom through the slots 21—21 and 22—22 of the side members 15 and 16 of the housing 14.

A spring 28 is attached by one end to the bar 27 of the pressure element and by the other to a transverse bar 29 attached to and connecting the side members 15 and 16 of the housing 14. At the end of the housing 14 opposite that at which bar 29 is located there is another transverse bar 30, mounted either rigidly or rotatably, and serving as a guide for the line 10 passing therefrom.

A lever arm 31, pivoted at 32 in the side portion 15 of the housing 14, is connected at an end to the transverse bar 26 attached to the pressure member 23, and is actuated for a purpose set forth hereinafter.

The following is the operation of the locking device. The end $10^a$ of the line 10 is inserted at 18 in the device, passing between the top portion 17 thereof and the roughened surface of part 24 of the locking or pressure member, which is normally constantly applied against the line 10 by the action of the spring 28 exerting traction on the locking element, the bars 26 and 27 of which are guided in the parallel, arcuate slots 21—21 and 22—22 of the housing 14 in such manner that the top 24 of the pressure member is always parallel to the top 17 of the housing and the entire roughened surface 24 forced into retentive engagement with the line 10, which is thus retained between these two parts.

It is apparent that the line 10, on being drawn through the locking device, will be automatically tightened and retained thereby.

In order to release the line 10, the lever 31 is moved to the left from its position shown on the drawing, bar 26 being thereby moved forwardly and downwardly and the roughened surface of part 24 hence being carried out of engagement with the line, such movement of lever arm 31 overcoming the force of the spring 28.

It is understood that the invention is not limited to the exact form, dimensions and constructional details set forth herein by way of example, but may be varied without exceeding the scope of the invention.

Having described our invention, what we claim is:

1. In a device of the class described, a housing having a multiplicity of slots in opposite walls thereof, the slots in the same wall being eccentric but of substantially the same curvature, there being a slot in each wall similar to and opposite each slot in the other of said walls, a pressure member within said housing and movable in the slots thereof into and out of contact with the object to be retained.

2. In a device of the class described, a housing, arcuate slots in said housing, a pressure member within said housing and slidable in said slots into and out of contact with an object to be retained, a lever attached to said housing and to said pressure member, whereby said pressure member is actuated to retain and to release a cable.

3. A clothes line attachment comprising a housing, a pressure member within said housing, each side of said housing having two parallel, arcuate slots, said pressure member being provided with transverse bars extending therefrom through said arcuate slots, a spring attached to said housing and to said pressure member normally tending to force the latter toward the top of the housing, a lever attached to said housing and to said pressure member which lever is actuated for the release of an object retained between the pressure member and the top of the housing.

4. The combination of supports, pulleys attached to said supports, a cable movably passed about said pulleys, one end of said cable being permanently attached to a locking device and the other end of said cable being releasably attached to said locking device, said locking device comprising a housing and a pressure member within said housing between which members the said cable is passed, means by which said pressure member is constantly applied against the said cable, means attached to said housing for releasing the cable and means to automatically retain the pressure member against said cable.

GRANT HAZLETT.
CHAS. H. MITCHELL.